United States Patent [19]

Taketsugu

[11] Patent Number: 5,530,910
[45] Date of Patent: Jun. 25, 1996

[54] HANDOVER METHOD IN MOBILE COMMUNICATIONS SYSTEM

[75] Inventor: Masanori Taketsugu, Tokyo, Japan

[73] Assignee: NEC Corporation, Tokyo, Japan

[21] Appl. No.: 364,462

[22] Filed: Dec. 27, 1994

[30] Foreign Application Priority Data

Dec. 27, 1993 [JP] Japan .................... 5-330296

[51] Int. Cl.$^6$ .................................. H04Q 7/00
[52] U.S. Cl. .......................... 455/33.2; 455/33.4
[58] Field of Search ............... 455/33.1, 33.2, 455/33.4, 34.1, 54.1, 56.1; 379/58, 59, 60

[56] References Cited

U.S. PATENT DOCUMENTS

| | | | |
|---|---|---|---|
| 5,175,867 | 12/1992 | Wejke et al. | 455/56.1 |
| 5,265,263 | 11/1993 | Ramsdale et al. | 455/54.1 |
| 5,278,991 | 1/1994 | Ramsdale et al. | 455/54.1 |
| 5,379,446 | 1/1995 | Murase | 455/33.2 |
| 5,396,645 | 3/1995 | Huff | 455/33.4 |

FOREIGN PATENT DOCUMENTS

| | | | |
|---|---|---|---|
| 2-143725 | 6/1990 | Japan . | |
| 5-3581 | 1/1993 | Japan . | |
| 2225196 | 5/1990 | United Kingdom | 455/33.2 |

OTHER PUBLICATIONS

Fumiaki Ishino, et al "Mobile Communication Switching System For Voice/Nonvoice Services" *IEE 1991, Globecom '91* pp. 1485–1489.

STS Chia, "The Control Of Handover Initiation In Microcells" *IEEE 1991* pp. 531–536.

*Primary Examiner*—Reinhard J. Eisenzopf
*Assistant Examiner*—Marsha D. Banks-Harold
*Attorney, Agent, or Firm*—Sughrue, Mion, Zinn, Macpeak & Seas

[57] ABSTRACT

The handover method disclosed relates to a mobile communication system in which, based on the number of handovers in mobile units, the size of the radio zone to be assigned to a mobile unit is selected. The mobile switching center measures the number of handovers in each of the mobile units engaging in communication and, during the handover in the mobile unit, the handover target radio zone is assigned based on the measured value of the number of handovers. The target handover of mobile units is determined by the target determination controller based the number of handovers memorized in the handover number recorder. The assignment of the appropriate size radio zone prevents an excess load on the mobile switching center and the capacity to accommodate subscribers in the mobile communication system is enhanced.

6 Claims, 4 Drawing Sheets

| MOBILE UNIT IDENTIFIER | HANDOVER NUMBER |
|---|---|
| MS1 | 1.5 |
| MS2 | 0.3 |
| ⋮ | ⋮ |

| MOBILE UNIT IDENTIFIER | RADIO ZONE IDENTIFIER | COMMUNICATION CHANNEL IDENTIFIER |
|---|---|---|
| MS1 | ZM1 | Ch1 |
| MS2 | ZM4 | Ch3 |
| ⋮ | ⋮ | ⋮ |

FIG.8

| LAPSE OF TIME | 2:04 |
|---|---|
| TIME OF HANDOVER | 0:18 |
| | 0:40 |
| | 1:21 |

HANDOVER METHOD IN MOBILE COMMUNICATIONS SYSTEM

BACKGROUND OF THE INVENTION

1. Field of the Invention

The present invention relates to a mobile communication system, and more particularly to a handover method in a mobile communication system used in multiple radio zones.

2. Description of the Related Art

In a conventional mobile communication system that provides services with mobile unite (mobile stations) such as automobile or portable telephones, a system is employed whereby the entire servicing area of the mobile communication system is divided into small zones which are covered by a plurality of radio zones. The radio zone here means a range of area in which communication is made between respective radio base stations and mobile units through radio channels, and there is one radio base station in one radio zone and each mobile unit can freely move within this radio zone.

Also, each radio base station can utilize a plurality of radio channels and, based on the condition of radiowave propagation between the radio base station and the mobile unit concerned in communication, the radio channel used is decided. Further, when, in the course of receiving the services from the mobile communication system, the mobile unit experiences a deterioration of radiowave propagation environments of the radio channel being used, it is possible for the mobile unit to change the channel to another channel. This change-over of channels during the communication is called "handover". The device which controls the radio base stations and carries out exchanges with fixed networks (public telephone networks) is the mobile switching center.

Where the small zone system as explained above is adopted, it is necessary that the current location of the mobile unit be registered in order to receive calls addressed to the traveling mobile unit. Various location registration systems have been proposed, and one of them has been disclosed in Japanese Patent Application Kokai Publication No. Hei 5-3581.

Two typical handover systems, according to a reference (S T S Chia, "The control of handover initiation in microcells", IEEE VTC '91, pp. 531–536, 1991), are a backward handover initiation via the existing radio channel and a forward handover initiation via the target radio channel.

In the conventional systems, as shown in a reference (Fumiaki Ishino at. al, "Mobile Communication Switching System for Voice/Nonvoice Services", IEEE GLOBECOM '91, pp. 485–1489, 1991), the existing radio base station and the target radio base station are multi-connected by the mobile switching centers during the handover in order to prevent the occurrence of a momentary disruption at the handover.

In the foregoing mobile communication system, as a means to effectively utilize radio frequencies, each of the radio zones is made small so that the same frequency may be repeatedly used in remote zones. Along with the making of zones smaller in this way, the handovers with which the mobile unit travels from one radio zone to another have become more frequent, resulting in a burden to the mobile switching center. Also, the multiple radio zone environment in which radio zones of varying sizes coexist necessitates the handover processing among the radio zones of different sizes. Thus, various means are being studied so as not to increase the volume of control processing of handovers.

A method for processing calls or communications has been disclosed in Japanese Patent Application Kokai Publication No. Hei 2-143725 in which, for selecting control channels in a multiple radio zone environment, the traveling speed of the mobile unit is estimated using the fading pitch of changes in the received signal level or the number of level crossings and, when the traveling speed of the mobile unit is high, the control channel of the large radio zone is selected while, when the traveling speed of the mobile unit is low, the control channel of the small radio zone is selected.

In the conventional technology, where the arrangement disclosed in the above Japanese Patent Application Kokai Publication No. Hei 2-143725 is applied to the handovers in the multiple radio zone environment, since the size of the handover target radio zone needed is selected based on the physical speed of the mobile unit, it requires a device which measures the fading pitch or the number of level crossings. Also, due to differences in the mobile characteristics such as the size of the radio zone in which the mobile unit currently exists and the ways in which the mobile unit travels, the mobile unit which travels faster does not necessarily traverse a larger number of boundaries of radio zones, hence a larger number of handovers. Furthermore, in the future, the multiple radio zone environment in which the radio zones of varying sizes coexist may change so as to cover a very small zone, smaller than that now contemplated or a very large zone, or a nation wide radio zone realized by use of satellite, in which case the selection of radio zones by the physical speeds of the mobile unit will become meaningless due to diversification of environment.

SUMMARY OF THE INVENTION

An object of the invention, therefore, is to overcome the problems existing in the prior art and to provide an improved handover method in a mobile communication system in which, based on the number of handovers in mobile units, the size of the radio zone to be assigned to a mobile unit is selected and the assignment of the appropriate size radio zone prevents an excess load on the mobile switching center, whereby the capacity to accommodate subscribers in the mobile communication system is enhanced.

According to first aspect of the invention there is provided a handover method in a mobile communication system which comprises a plurality of radio base stations for communication with a plurality of mobile units using radio channels, the plurality of radio base stations covering a plurality of radio zones whose sizes are different from one another, end a mobile switching center for controlling the plurality of radio base stations, the radio zones having different sizes being overlapped thereby constituting a multi-radio zone environment, the handover method comprising the steps of: measuring, by the mobile switching center, the number of handovers in each of the mobile units engaging in communication; and assigning, during the handover in the mobile unit, a handover target radio zone based on the measured value of the number of handovers.

In the first aspect of the invention, the mobile switching center recognizes a radio base station, with which the mobile unit in communication has established radio connection, and a communication channel. In this mobile switching center, the number of handovers is calculated and, if the number of handovers i$ higher than its threshold value, the mobile unit is allowed to make the handover to a radio zone whose size is larger than the current radio zone so that it is possible to control the handover processing at the mobile switching center. Thus, it is possible to realize the efficient operation of handovers corresponding to the handover processing capability of the mobile exchanger.

According to a second aspect of the invention, the method is featured that, in the step of assigning the handover target radio zone, if the measured value of the number of handovers is higher than a threshold value, the handover target radio zone to be assigned is a zone whose size is larger than that of the radio zone with which the mobile unit is in communication.

In the second aspect of the invention, the mobile switching center recognizes a radio base station, with which the mobile unit in communication has established radio connection, and a communication channel. In this mobile switching center, the number of handovers is calculated and, if the number of handovers is higher than its threshold value, the mobile unit is allowed to make the handover to a radio zone whose size is larger than the current radio zone so that it is possible to decrease the amount of handover processing at the mobile switching center. Thus, it is possible to realize the operation of handovers which corresponds to the handover processing capability of the mobile exchanger.

According to a third aspect of the invention, the method is featured that, in the step of assigning the handover target radio zone, if the measured value of the number of handovers is lower than a threshold value, the handover target radio zone to be assigned is a zone whose size is smaller than that of the radio zone with which the mobile unit is in communication.

In the third aspect of the invention, the mobile switching center recognizes a radio base station, with which the mobile unit in communication has established radio connection, and a communication channel. In this mobile switching center, the number of handovers is calculated and, if the number of handovers is lower than a threshold value, the mobile unit is allowed to make the handover to a radio zone whose size is smaller than the current radio zone, and this makes it possible to increase the frequencies in which the communication channels are used, thereby increasing the frequency utilization efficiency of the mobile communication system. The availability of radio zones whose spatial frequency utilization efficiency is higher makes it possible to accommodate a larger number of subscribers of the mobile communication system.

According to a fourth aspect of the invention, there is also provided a handover method in a mobile communication system which comprises a plurality of radio base stations for communication with a plurality of mobile unite using radio channels, the plurality of radio base stations covering a plurality of radio zones whose sizes are different from one another and a mobile switching center for controlling the plurality of radio base stations, the radio zones having different sizes being overlapped thereby constituting a multi-radio zone environment, the handover method comprising the steps of: measuring, by each of the plurality of mobile units, the number of handovers that have taken place in each of the plurality of mobile units; and assigning, during the handover in each of the plurality of mobile units, a handover target radio zone based on the measured value of the number of handovers that have taken place in the mobile unit itself.

In the fourth aspect of the invention, the mobile unit calculates the number of handovers having taken place among its own radio channels and, if the number of handovers is higher than its threshold value, the mobile unit is allowed to make a request to the mobile switching center for the handover to a radio zone whose size is larger than the current radio zone. This makes it possible to control the handover processing at the mobile unit.

According to a fifth aspect of the invention, the method is featured that, in the step of assigning the handover target radio zone, if the measured value of the number of handovers that have taken place in the mobile unit itself is higher than a threshold value, the handover target radio zone assigned is a zone whose size is larger than that of the radio zone with which the mobile unit is in communication.

In the fifth aspect of the invention, the mobile unit calculates the number of handovers having taken place among its own radio channels and, if the number of handovers is higher than the threshold value, the mobile unit is allowed to make a request to the mobile switching center for the handover to a radio zone whose size is larger than the current radio zone. This makes it possible to decrease the amount of the handover processing at the mobile unit.

According to the sixth aspect of the invention, the method is featured that, in the step of assigning the handover target radio zone, if the measured value of the number of handovers that have taken place in the mobile unit itself is lower than a threshold value, the handover target radio zone assigned is a zone whose size is smaller than that of the radio zone with which the mobile unit in communication.

In the sixth aspect of the invention, the mobile unit calculates the number of handovers having taken place among its own radio channels and, if the number of handovers is smaller than the threshold value, the mobile unitis allowed to make a request to the mobile switching center for the handover to a radio zone whose size is smaller than the current radio zone. This makes it possible to suppress the power needed for the mobile unit to communicate with radio base stations and to save the power consumption.

BRIEF DESCRIPTION OF THE DRAWINGS

The above and other objects, features and advantages of the present invention will be apparent from the following description of preferred embodiments of the invention explained with reference to the accompanying drawings, in which:

FIG. 8 is a system diagram of a handover number counter within the mobile unit which realizes a handover method according to the fourth to sixth aspects the invention.

PREFERRED EMBODIMENTS OF THE INVENTION

Now, preferred embodiments of the invention are explained with reference to the accompanying drawings.

Figures 1, 2, 3:
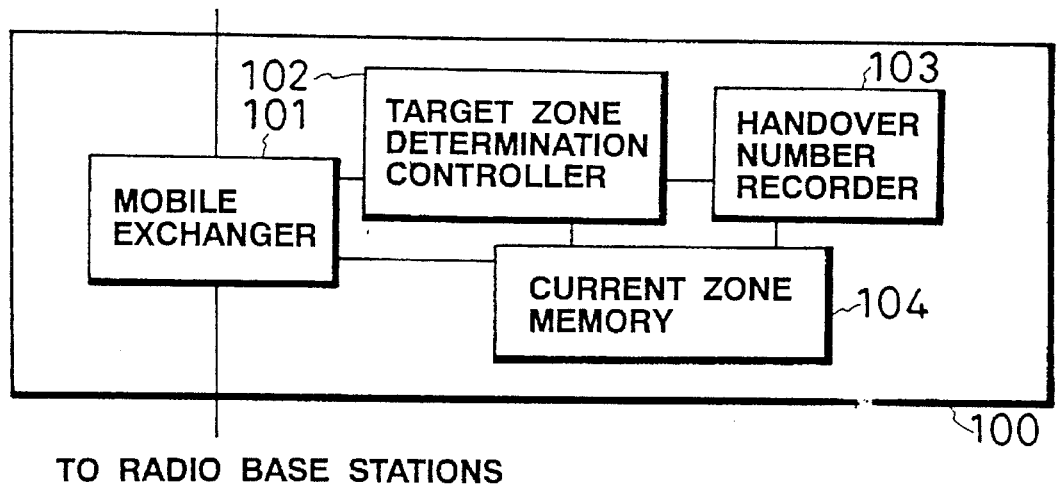
FIG. 1 is a system diagram of a mobile switching center which realizes a handover method according to the first to third aspects of the invention.
FIG. 2 is a system example of a table showing the number of handovers memorized at a mobile switching center to realize a handover method according to the first to third aspects of the invention.
FIG. 3 is a system example of a current radio zone memory at a mobile switching center to realize a handover method according to the first to third aspects of the invention.
Figure 4:
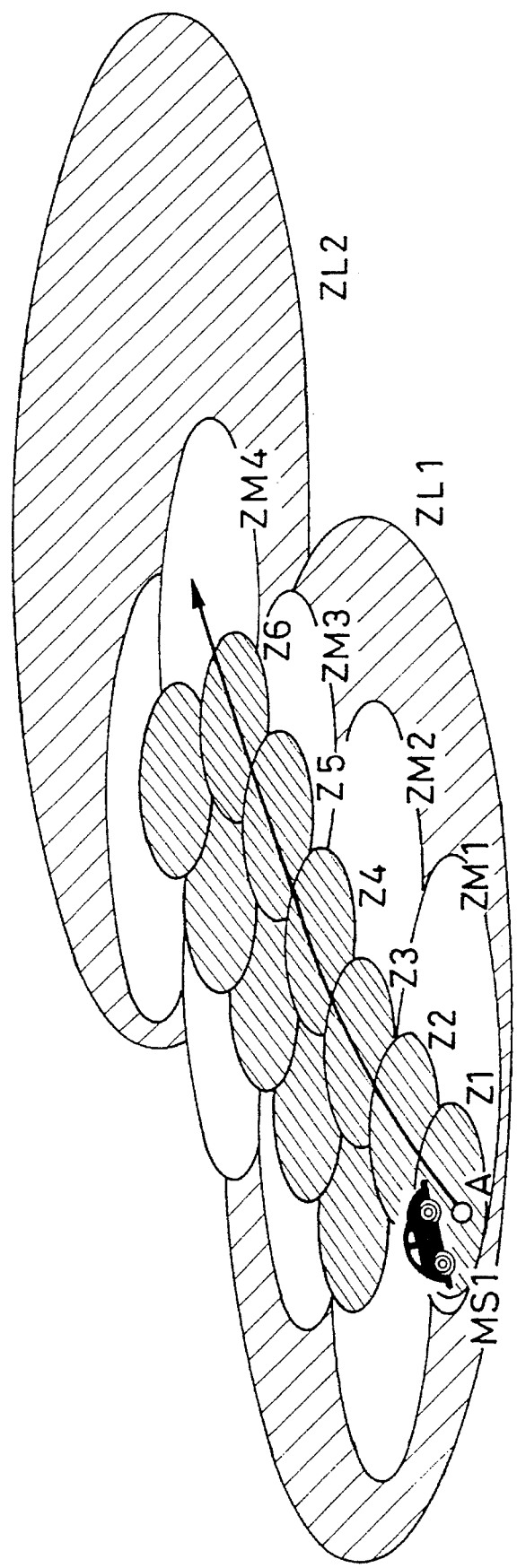
FIG. 4 is a system example of a multiple radio zone environment in which the handover according to the invention is realized.

FIG. 1 shows, in a system diagram, a mobile switching center which realizes the handover system according to the invention. In FIG. 1, the numeral 100 denotes the mobile switching center, 101 denotes a mobile exchanger, 102 denotes a target zone determination controller, 103 denotes a handover number recorder, and 104 denotes a current radio zone memory. An embodiment of this invention is now explained using a multiple radio zone environment shown in FIG. 4. In FIG. 4, Z1–Z6 are small zones, ZM1–ZM4 are medium size zones, and ZL1–ZL2 are large zones, and it is shown that the mobile unit (Mobile Station) MS1 is located at point A and will be traveling along the arrow by using the communication channel $Ch_1$ of the radio zone ZM1.

The mobile switching center 100 stores, in the current radio zone memory 104 therein, information as to in which radio zone each of the mobile units is currently located and which communication channel is being used by such a mobile unit. The current radio zone memory 104 can be configured as shown in FIG. 3. As shown therein, the current radio zone memory 104 consists of an identifier of a mobile unit, an identifier of a radio zone in which the mobile unit is currently located, and a communication channel being used. The handover number recorder 103 calculates, as the number of handovers, the changes that take place in the radio zone identifier and the communication identifier of each of the mobile units based on the information stored in the current radio zone memory 104, and memorizes the number of handovers in each of the mobile units. The handover number recorder 103 may be constituted, for example, as shown in FIG. 2. As shown therein, the handover number recorder 103 is constituted by the identifiers of the mobile units and the number of handovers. The number of handovers is stored as the number of handovers per 10 minutes, for example.

The mobile switching center 100 controls the target handover of each of the mobile unit based on the number of handovers stored in the handover number recorder 103, for example, in the manner explained hereinafter.

Figure 5:
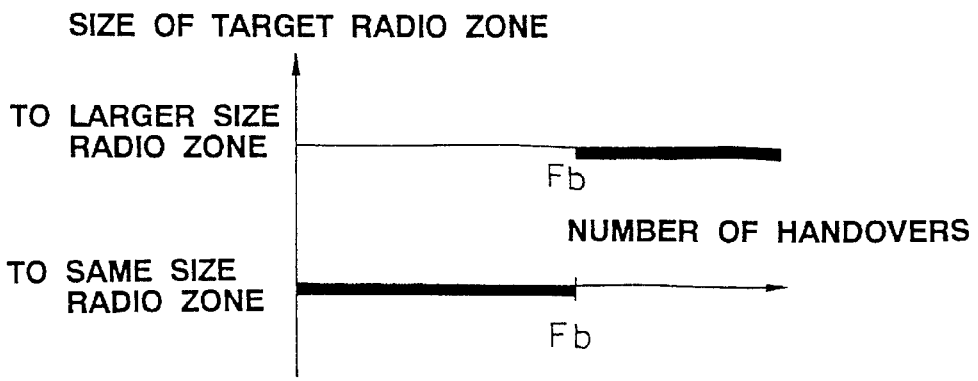
FIG. 5 is a graph with which the size of a mobile target radio zone is determined by a target determination controller which realizes a method of the second and fourth aspects of the invention.

The target determination controller 102 determines the target handover of mobile units based on the graph shown in FIG. 5. In FIG. 5, Fb represents a predetermined threshold value.

The target determination controller 102 calculates the number of handovers by measuring the total number of the handovers in the mobile switching center 100 and, if the calculated number exceeds the predetermined threshold value Fb, the target zone of the mobile unit with the largest number of handovers among the numbers recorded in the handover recorder 103 is determined as a radio zone larger than the current radio zone of that mobile unit, and the mobile exchanger is controlled accordingly. Referring to FIG. 4, when the mobile unit MS1 hands over from the current radio zone ZM1, the mobile switching center allows the zone to be transferred to ZL1 which is larger than ZM1. Also, an alternative method conceivable Is that, in the target determination controller 102, the number of handovers in each of the mobile units is read out from the handover recorder 103 in the mobile switching center 100, end if the number exceeds the predetermined threshold value Fb in each of the mobile units, the target zone of the mobile unit is determined as a radio zone larger than the current radio zone of that mobile unit, and the mobile switching center is controlled accordingly.

Figure 6:
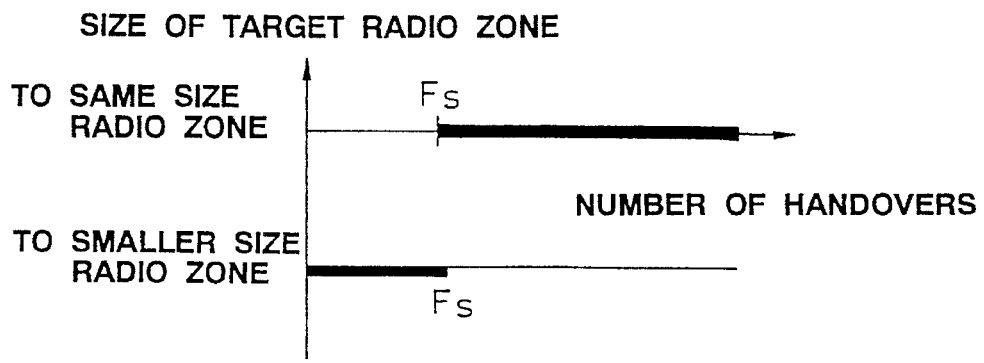
FIG. 6 is a graph with which the size of a mobile target radio zone is determined by a target determination controller which realizes a method of the third and sixth aspects of the invention.

The target determination controller 102 can control the handover targets of the mobile unit based on the information as shown in the graph of FIG. 6. In FIG. 6, Fs represents a predetermined threshold value.

The target determination controller 102 calculates the number of handovers by measuring the total number of the handovers in the mobile switching center 100 and, if the calculated number is smaller than the predetermined threshold value Fs, the target zone of the mobile unit with the smallest number of handovers among the numbers stored in the handover recorder 103 is determined as a radio zone smaller than the current radio zone of that mobile unit, and the mobile exchanger is controlled accordingly. Referring to FIG. 4, when the mobile unit MS1 makes a handover from the current radio zone ZM1, the mobile switching center 100 allows the zone to be transferred to the zone Z1 which is smaller than the zone ZM1. Also, an alternative method conceivable is that, in the target determination controller 102, the number of handovers in each of the mobile units is read out from the handover recorder 103 in the mobile switching center 100, and if the number is smaller than the predetermined threshold value Fs in each of the mobile units, the target zone of the mobile unit is determined as a radio zone smaller than the current radio zone of that mobile unit, and the mobile switching center 100 is controlled accordingly.

Where the target zone determination controller 102 has both the controlling functions shown in the graphs of FIGS. 5 and 6, it is possible for the device to carry out both the controls at the same time.

Figure 7:
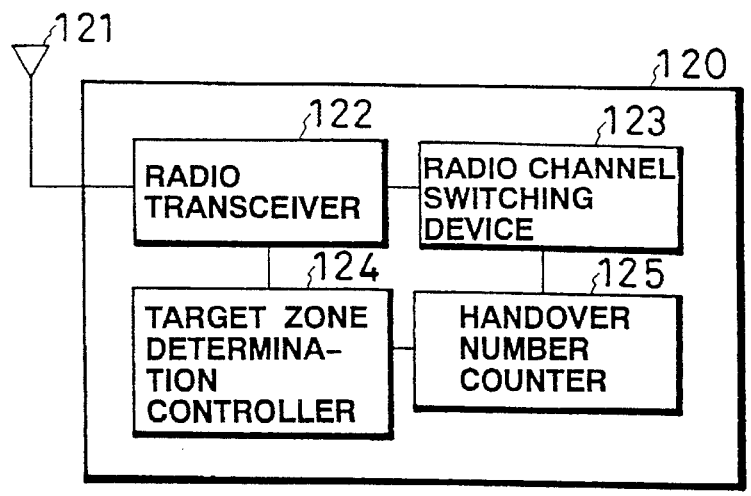
FIG. 7 is a system diagram of a mobile unit which realizes a handover method according to the fourth to sixth aspects the invention.

FIG. 7 is a system diagram of the mobile unit for realizing the handover system of the fourth aspect of the invention. In the illustration therein, the numeral 120 denotes the mobile unit, 121 denotes an antenna, 122 denotes a radio transceiver, 123 is a radio channel switching device, 124 is a target zone determination controller, and 125 denotes a handover number counter.

An explanation is made here also using a multiple radio zone environment shown in FIG. 4. In FIG. 4, Z1–Z6 are small zones, ZM1–ZM4 are medium size zones, and ZL1–ZL2 are large zones, and it is shown that the mobile unit MS1 is located at point A and will be traveling along the arrow by using the communication channel $Ch_1$ of the radio zone ZM1.

The mobile unit MS1 carries out the handovers using the radio channel switching device 123, memorizes the handover time in the handover number counter 125 every time the radio channel is switched, and calculates the number of handovers. As an example, the handover number counter 125 is constituted as Shown in FIG. 8. The handover number counter 125 memorizes the time lapsed from the start of the communication, and the time lapsed from the start of the communication to the time when each of the handovers took place, thereby calculating the number of handovers.

The mobile unit MS1 controls its own target handover based on the number of handovers stored in the handover number counter 125, for example, in the manner explained hereinafter.

The target determination controller 124 determines the target handover of mobile units based on the graph shown in FIG. 5. In FIG. 5, Fb represents a predetermined threshold value.

Based on the number of handovers calculated at the handover number counter 125, when the calculated number of handovers is larger than the predetermined threshold value Fb, the target determination controller 124 determines, on its own, the transfer to a radio zone that ie larger than the current radio zone of the mobile unit, and makes a request, through the radio transceiver 122, to the mobile switching center for the handover. Referring to FIG. 4, where the mobile unit MS1 handovers from the current zone ZM1, the transfer is made to the zone ZL1 which is larger then the zone ZM1.

Further, the target zone determination controller 124 can control the target handover zones based on the information in the graph shown in FIG. 6 as follows. In FIG. 6, Fs is a predetermined threshold value. Based on the number of handovers calculated at the handover number counter 125, when the number of handovers is smaller than the predetermined threshold value Fs, the target determination controller 124 determines, on ire own, the transfer to a radio zone that is smaller than the current radio zone of the mobile unit, and makes a request, through the radio transceiver 122, to the mobile switching center for the handover. For example, in FIG. 4, where the mobile unit MS1 makes a handover from the current zone ZM1, the transfer is made to the zone Z2 which is smaller than the zone ZM1.

Where the target zone determination controller 124 has both the controlling functions shown in the graphs of FIGS. 5 and 6, it is possible for the device to carry out both the controls at the same time.

While the invention has been described in its preferred embodiments, it is to be understood that the words which have been used are words of description rather than limitation and that changes within the purview of the appended claims may be made without departing from the true scope of the invention as defined by the claims.

What is claimed is:

1. A handover method in a mobile communication system which comprises a plurality of radio base stations for communication with a plurality of mobile units using radio channels, said plurality of radio base stations covering a plurality of radio zones whose sizes are different from one another, and a mobile switching center for controlling said plurality of radio base stations, said radio zones having different sizes being overlapped thereby constituting a multi-radio zone environment, said handover method comprising the steps of:

measuring, by said mobile switching center, the number of handovers in each of said mobile units engaging in communication; and assigning, during the handover in said mobile unit, a handover target radio zone based on the measured value of said number of handovers.

2. A handover method in a mobile communication system which comprises a plurality of radio base stations for communication with a plurality of mobile units using radio channels, said plurality of radio base stations covering a plurality of radio zones whose sizes are different from one another, and a mobile switching center for controlling said plurality of radio base stations, said radio zones having different sizes being overlapped thereby constituting a multi-radio zone environment, said handover method comprising the steps of:

measuring, by said mobile switching center, the number of handovers in each of said mobile units engaging in communication; and assigning, during the handover in said mobile unit, a handover target radio zone based on the measured value of said number of handovers;

in which, in the step of assigning the handover target radio zone, if the measured value of said number of handovers is higher than a threshold value, the handover target radio zone to be assigned is a zone whose size is larger than that of the radio zone with which said mobile unit is in communication.

3. A handover method in a mobile communication system which comprises a plurality of radio base stations for communication with a plurality of mobile units using radio channels, said plurality of radio base stations covering a plurality of radio zones whose sizes are different from one another, and a mobile switching center for controlling said plurality of radio base stations, said radio zones having different sizes being overlapped thereby constituting a multi-radio zone environment, said handover method comprising the steps of:

measuring, by said mobile switching center, the number of handovers in each of said mobile units engaging in communications, and assigning, during the handover in said mobile unit, a handover target radio zone based on the measured value of said number of handovers;

in which, in the step of assigning the handover target radio zone, if the measured value of said number of handovers is lower than a threshold value, the handover target radio zone to be assigned is a zone whose size is smaller than that of the radio zone with which said mobile unit is in communication.

4. A handover method in a mobile communication system which comprises a plurality of radio base stations for communication with a plurality of mobile units using radio channels, said plurality of radio base stations covering a plurality of radio zones whose sizes are different from one another and a mobile switching center for controlling said plurality of radio base stations, said radio zones having different sizes being overlapped thereby constituting a multi-radio zone environment, said handover method comprising the steps of:

measuring, by each of said plurality of mobile units, the number of handovers that have taken place in each of said plurality of mobile units; and assigning, during the handover in each of said plurality of mobile units, a handover target radio zone based on the measured value of said number of handovers that have taken place in the mobile unit itself.

5. A handover method in a mobile communication system which comprises a plurality of radio base stations for communication with a plurality of mobile units using radio channels, said plurality of radio base stations covering a plurality of radio zones whose sizes are different from one another and a mobile switching center for controlling said plurality of radio base stations, said radio zones having different sizes being overlapped thereby constituting a multi-radio zone environment, said handover method comprising the steps of:

measuring, by each of said plurality of mobile units, the number of handovers that have been taken place in each of said plurality of mobile units; and assigning, during the handover in each of said plurality of mobile units, a handover target radio zone based on the measured value of said number of handovers that have taken place in the mobile unit itself;

in which, in the step of assigning the handover target radio zone, if the measured value of said number of handovers that have taken place in the mobile unit itself is higher than a threshold value, the handover target radio zone assigned is a zone whose size is larger than that of the radio zone with which said mobile unit is in communication.

6. A handover method in a mobile communication system which comprises a plurality of radio base stations for communication with a plurality of mobile units using radio channels, said plurality of radio base stations covering a plurality of radio zones whose sizes are different from one another and a mobile switching center for controlling said plurality of radio base stations, said radio zones having different sizes being overlapped thereby constituting a multi-radio zone environment, said handover method comprising the steps of:

measuring, by each of said plurality of mobile units, the number of handovers that have been taken place in each of said plurality of mobile units; and assigning, during the handover in each of said plurality of mobile units, a handover target radio zone based on the measured value of said number of handovers that have taken place in the mobile unit itself;

in which, in the step of assigning the handover target radio zone, if the measured value of said number of handovers that have taken place in the mobile unit itself is lower than a threshold value, the handover target radio zone assigned is a zone whose size is smaller than that of the radio zone with which said mobile unit is in communication.

\* \* \* \* \*